United States Patent [19]

Nishiki

[11] Patent Number: 5,420,431
[45] Date of Patent: May 30, 1995

[54] IMAGING APPARATUS USING MULTIPLE IMAGE SIGNAL READ OUT LINES WITH IMPROVED IMAGE QUALITY

[75] Inventor: Masayuki Nishiki, Tochigiken, Japan

[73] Assignee: Kabushiki Kaisha Toshiba, Kanagawa, Japan

[21] Appl. No.: 96,274

[22] Filed: Jul. 26, 1993

[30] Foreign Application Priority Data

Jul. 28, 1992 [JP] Japan .................................. 4-200966

[51] Int. Cl.$^6$ ............................ A61B 1/04; H05G 1/64
[52] U.S. Cl. ............................ 250/370.09; 250/370.08; 382/254
[58] Field of Search ..................... 250/370.09, 370.08, 250/370.01; 348/607, 611; 382/54; 333/203

[56] References Cited

U.S. PATENT DOCUMENTS 4,145,675  3/1979  Picquendar ........................ 328/167
5,091,925  2/1992  Haendle et al. ...................... 348/607
5,181,100  1/1993  Hodgson ............................ 348/607

Primary Examiner—Paul M. Dzierzynski
Assistant Examiner—Richard Hanig
Attorney, Agent, or Firm—Finnegan, Henderson, Farabow, Garrett & Dunner

[57] ABSTRACT

An imaging apparatus using multiple image signal read out lines with an improved image quality, capable of preventing the lowering of the resolution and the appearance of the ringing artifact, as well as the appearance of the false image in a form of vertical stripes, which is particularly suitable for the application in the X-ray diagnostic apparatus. The imaging apparatus is equipped with an imaging element for receiving optical image data of an imaging target and converting the received optical image data into electric signals, having a plurality of read out lines for outputting the obtained electric signals; a mixer for mixing the electric signals transmitted through the read out lines to obtain image data in an appropriately rearranged order; a digital low pass filter for digitally removing at least one specific frequency component from the image data obtained by the mixer to obtain display image data; and a display device for displaying the display image data obtained by the digital low pass filter.

10 Claims, 9 Drawing Sheets

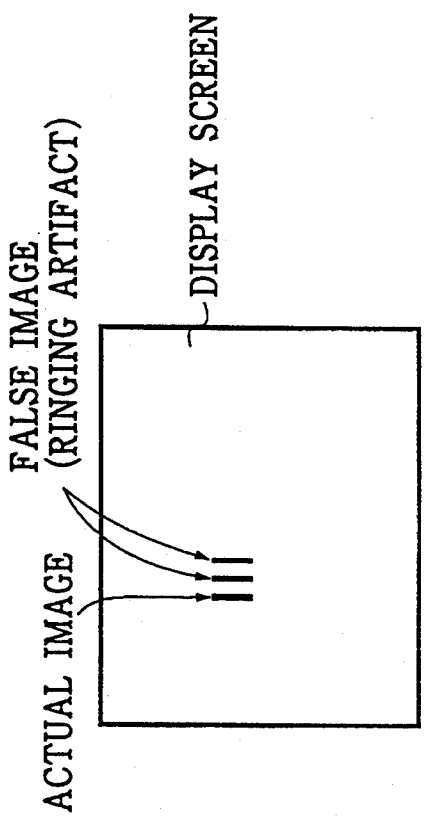
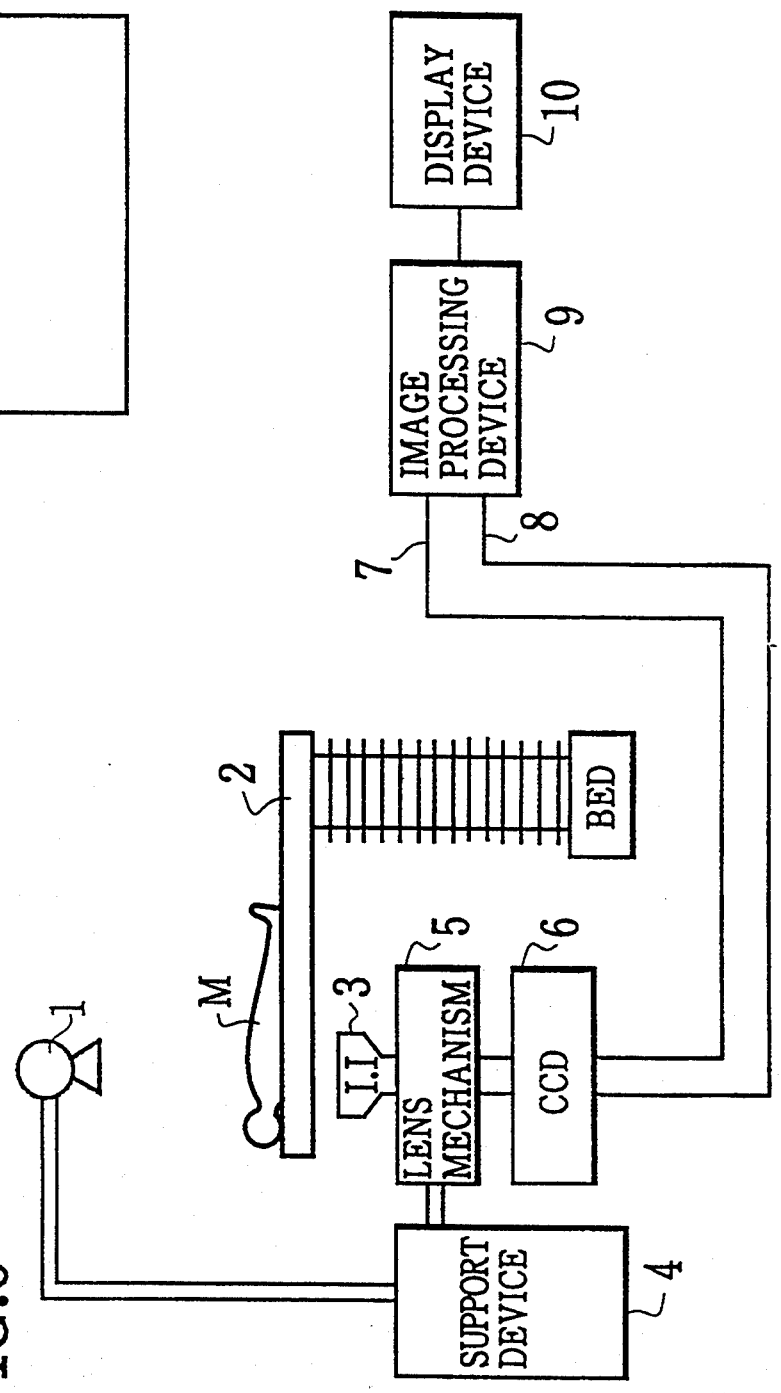

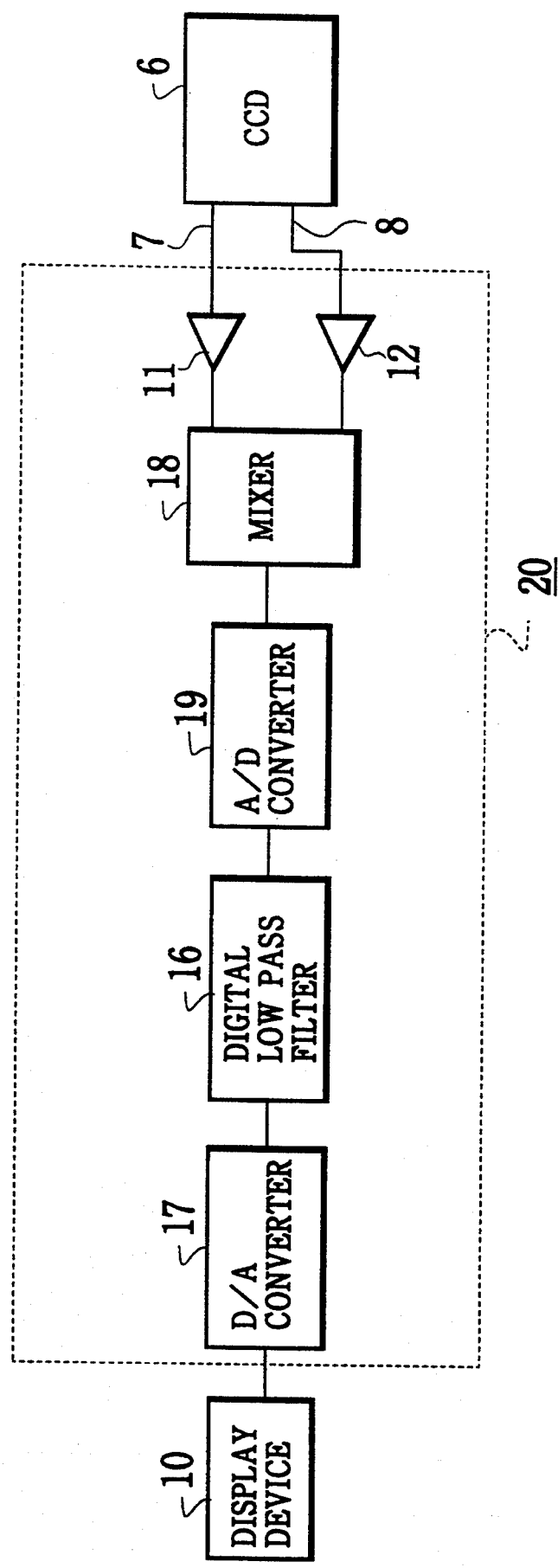

IMAGING APPARATUS USING MULTIPLE IMAGE SIGNAL READ OUT LINES WITH IMPROVED IMAGE QUALITY

BACKGROUND OF THE INVENTION

1. Field of the Invention

The present invention relates to an imaging apparatus using more than one image signal read out lines for outputting obtained image data.

2. Description of the Background Art

Conventionally, as a means for converting the image data into electric signals, a solid state imaging element such as a CCD (Charge Coupled Device) has been utilized widely.

A conventional CCD typically has a configuration as shown in FIG. 1, which generally comprises an imaging unit 104 in which cells 102 capable of storing received lights in terms of electric signals are arranged in N by M matrix, and a horizontal transmission unit 105 which is a series of M shift registers for outputting the image data collected by the imaging unit 104 in a horizontal direction to an external device. In addition, the imaging unit 104 is further equipped with a vertical transmission unit 103 for each column which transmits the image data collected by each cell 102 on each column of the N by M matrix in a vertical direction to the horizontal transmission unit 105. In such a CCD, the actual image data are converted into the electric signals at the imaging unit 104, so that a number M×N of the cells 102 in the imaging unit 104 defines a number of picture elements in the CCD.

In order to display the image taken by such a CCD in a display device (not shown), it is necessary to transmit the electric signals representing the image data collected by the imaging unit 104 from the horizontal transmission unit 105 through a read out line 101 connected to the display device.

This image data output operation is actually carried out in the CCD as follows. First, the electric signal stored in each cell 102 is transferred to the vertical transmission unit 103, row by row. The vertical transmission unit 103 sequentially shifts down the electric signal transferred from each cell 102 to the horizontal transmission unit 105 by utilizing the charge tranfer effect of the CCD elements. The horizontal transmission unit 105 sequentially shifts the electric signal transmitted from the vertical transmission unit 103 to the read out line 101 from which the electric signal is outputted to the external device. Here, after the stored electric signal is transferred to the vertical transmission unit 103, each cell 102 starts storing the next image data by converting the received lights in terms of the electric signals.

When the image data of the cell 102 at the a-th row and the b-th column in the imaging unit 104 is expressed as Sab, the image data of the cells 102 sequentially outputted through the read out line 101 are in an order of (S1n, S2n, —, Smn), —, (S12, S22, —, Sm2), (S11, S21, —, Sm1). The electric signals representing these image data are then amplified by an amplifier (not shown) connected on the read out line 101 and transmitted to the display device.

Now, in order to display the dynamic image on the display device, there is a need to display several tens of still pictures per second in succession, so that the shifting of the image data in the image data output operation at the CCD must be carried out at a high speed. In particular, the shifting in the horizontal transmission unit 105 is required to be carried out at a very high speed. For example, when the image data obtained by the CCD having 2 million picture elements in total are to be transmitted through a single read out line 101 at a rate of 30 frames per second, the image signals has a frequency of approximately 75 MHz, so that the horizontal transmission unit 105 must be capable of carrying out at least 75 million shifting operations per second.

However, to carry out as many as 75 million shifting operations per second presents practical problems related to the increased heat generation and the circuit implementation, so that it is a rather impractical requirement.

In order to cope with this difficulty, there has been devised a method for reducing the number of shifting operations in the horizontal direction by using a plurality of horizontal transmission units. For example, when the read out line is doubled, the frequency of the image signals in each read out line can be reduced to about one half of that required for a single read out line, so that the horizontal transmission units are required to have the shifting speed of only one half of that required in a case using a signal read out line.

A conventional CCD using double read out lines typically has a configuration as shown in FIG. 2. Namely, this double read out line type CCD comprises the imaging unit 104 equipped with the N by M cells 102 and the vertical transmission units 103 substantially similar to those shown in FIG. 1, and two horizontal transmission units 106 and 107, each of which is a series of M/2 shift registers for outputting the image data collected by the imaging unit 104 in a horizontal direction to an external device, through read out lines 108 and 109, respectively.

Here, in the image data output operation, the image data (S1n, S3n, —, S(m−1)n) of the cells 102 of odd columns are transmitted through the vertical transmission unit 103 to the first horizontal transmission unit 106, while the image data (S2n, S4n, —, Smn) of the cells 102 of even columns are transmitted through the vertical transmission unit 103 to the second horizontal transmission unit 107. The first and second horizontal transmission units 106 and 107 sequentially shift the electric signals transmitted from the vertical transmission unit 103 to the read out lines 108 and 109, respectively, from which the electric signals are outputted to the external device. After these shifting operations in the horizontal direction are finished, the shifting operations in the vertical direction are resumed, and this image data output operation is repeated until all the image data of the cells 102 of the imaging unit 104 are outputted.

Now, when such a CCD using double read out lines is employed, the display of the image data obtained by the CCD can be achieved by using a displaying system having a configuration as shown in FIG. 3.

Namely, for the CCD 110 having double read out lines 108 and 109, where the image data (S1n, S3n, —, S(m−1)n) of the cells 102 of odd columns are outputted through the first read out line 108 while the image data (S2n, S4n, —, Smn) of the cells 102 of even columns are outputted through the second read out line 109 in parallel to the output of the first read out line 108 as described above, the display system is equipped with a first amplifier 111 for amplifying the output of the first read out line 108, a second amplifier 112 for amplifying the output of the second read out line 109, a mixer 113 for mixing the amplified outputs obtained by the first and second amplifiers 111 and 112 in a correct order of (S1n, S2n, —, Smn), —, (S12, S22, —, Sm2), (S11, S21, —, Sm1), an analog low pass filter 114 for filtering the output of the mixer 113, and a display device 115 for displaying the amplified, rearranged, and filtered image data supplied from the analog low pass filter 114.

In this display system, the image data of the odd columns and the image data of the even columns are transmitted to the mixer 113 through two different paths, so that when there is a difference in the characteristics any of the horizontal transmission units, read out lines, and amplifiers constituting these two paths, the discrepancy between the image data of the odd columns and the image data of the even columns can cause the appearance of a false image in a form of vertical stripes on the displayed images.

For example, when the gain of the first amplifier 111 is greater than the gain of the second amplifier 112, the image data of the odd columns are more amplified compared with the image data of the even columns, so that when these image data are mixed by the mixer 113 and then directly displayed on the display device 115, the displayed images will have the false image in a form of vertical stripes in which the portions corresponding to the image data of the odd columns appear brighter than the portions corresponding to the image data of the even columns.

Here, it is known that the appearance of this false image in a form of vertical stripes can be prevented by removing a component at a specific frequency called the Nyquist frequency which is the highest frequency in the image data, so that the display system described above is equipped with the analog low pass filter 114 for removing this Nyquist frequency component from the output of the mixer 113, so as to prevent the appearance of the false image in a form of vertical stripes.

Now, in this display system, it is desirable for the analog low pass filter to remove only the Nyquist frequency component while leaving the remaining components of the image data without any attenuation.

However, the analog low pass filter has the frequency characteristic as shown in FIG. 4A, which indicates that the cut-off frequency fC at which the entered signal is attenuated by 3 dB is separated from the Nyquist frequency fN. Therefore, when the image data are filtered through the analog low pass filter 114, the high frequency components necessary for reconstructing the image at high resolution are also attenuated, so that the resolution of the displayed images is lowered. In order to avoid this lowering of the resolution of the displayed images, it is necessary to bring the cut-off frequency fC closer to the Nyquist frequency fN, but such an adjustment of the analog low pass filter has been difficult as the constants associated with elements of the analog low pass filter must be selected very accurately.

In addition, it has been difficult for the analog low pass filter to remove the Nyquist frequency component completely, because of the characteristics of the elements of the analog low pass filter.

Furthermore, when the cut-off frequency fC of the analog low pass filter is brought closer to the Nyquist frequency fN, the group delay in a vicinity of the cut-off frequency fC becomes very large as shown in FIG. 4B, and as a result, the ringing artifact as shown in FIG. 5 appears on the displayed images.

Now, the imaging apparatus shown in FIG. 3 incorporating the CCD using double read out lines and the display system as described above has been utilized widely in an X-ray diagnostic apparatus for obtaining an image of X-rays penetrated through a patient, which requires a relatively large number of picture elements compared with the other medical equipments using CCD. In such an X-ray diagnostic apparatus, the X-rays are irradiated onto the patient, and the X-rays penetrated through the patient are converted into optical images by means of an image intensifier, and then the obtained optical images are imaged by the imaging apparatus as described above and displayed by the display system as described above.

In this X-ray diagnostic apparatus, the displayed images are utilized in making the diagnosis of small tumors within fine blood vessels or internal organs, so that the lowering of the resolution or the appearance of the ringing artifact in the displayed images can affect the diagnosis, and in fact could possibly lead to a delaying of a discovery of the tumor.

SUMMARY OF THE INVENTION

It is therefore an object of the present invention to provide an imaging apparatus using multiple image signal read out lines with an improved image quality, capable of preventing the lowering of the resolution and the appearance of the ringing artifact, as well as the appearance of the false image in a form of vertical stripes, so that it is particularly suitable for the application in the X-ray diagnostic apparatus.

According to one aspect of the present invention there is provided an imaging apparatus. comprising: imaging element means for receiving optical image data of an imaging target and converting the received optical image data into electric signals, having a plurality of read out lines for outputting the obtained electric signals; mixing means for mixing the electric signals transmitted through the read out lines to obtain image data in an appropriately rearranged order; digital low pass filter means for digitally removing at least one specific frequency component from the image data obtained by the mixing means to obtain display image data; and display means for displaying the display image data obtained by the digital low pass filter means.

According to another aspect of the present invention there is provided an X-ray diagnostic apparatus. comprising: X-ray source means for irradiating X-rays onto an imaging target; image intensifier means for receiving the X-rays irradiated onto the imaging target and penetrated through the imaging target, and converting the received X-rays into optical image data; imaging element means for receiving the optical image data obtained by the image intensifier means and converting the received optical image data into electric signals, having a plurality of read out lines for outputting the obtained electric signals; mixing means for mixing the electric signals transmitted through the read out lines to obtain image data in an appropriately rearranged order; digital low pass filter means for digitally removing at least one specific frequency component from the image data obtained by the mixing means to obtain display image data; and display means for displaying the display image data obtained by the digital low pass filter means.

Other features and advantages of the present invention will become apparent from the following description taken in conjunction with the accompanying drawings.

BRIEF DESCRIPTION OF THE DRAWINGS

FIG. 5 is an illustration of the ringing artifact appearing on a displayed image in the conventional imaging apparatus of FIG. 3.

FIG. 6 is a schematic block diagram of one embodiment of an X-ray diagnostic apparatus suitable for employing an imaging apparatus according to the present invention.

FIG. 9 is a block diagram of a second embodiment of an imaging apparatus according to the present invention.

DETAILED DESCRIPTION OF THE PREFERRED EMBODIMENTS

Figure 1:
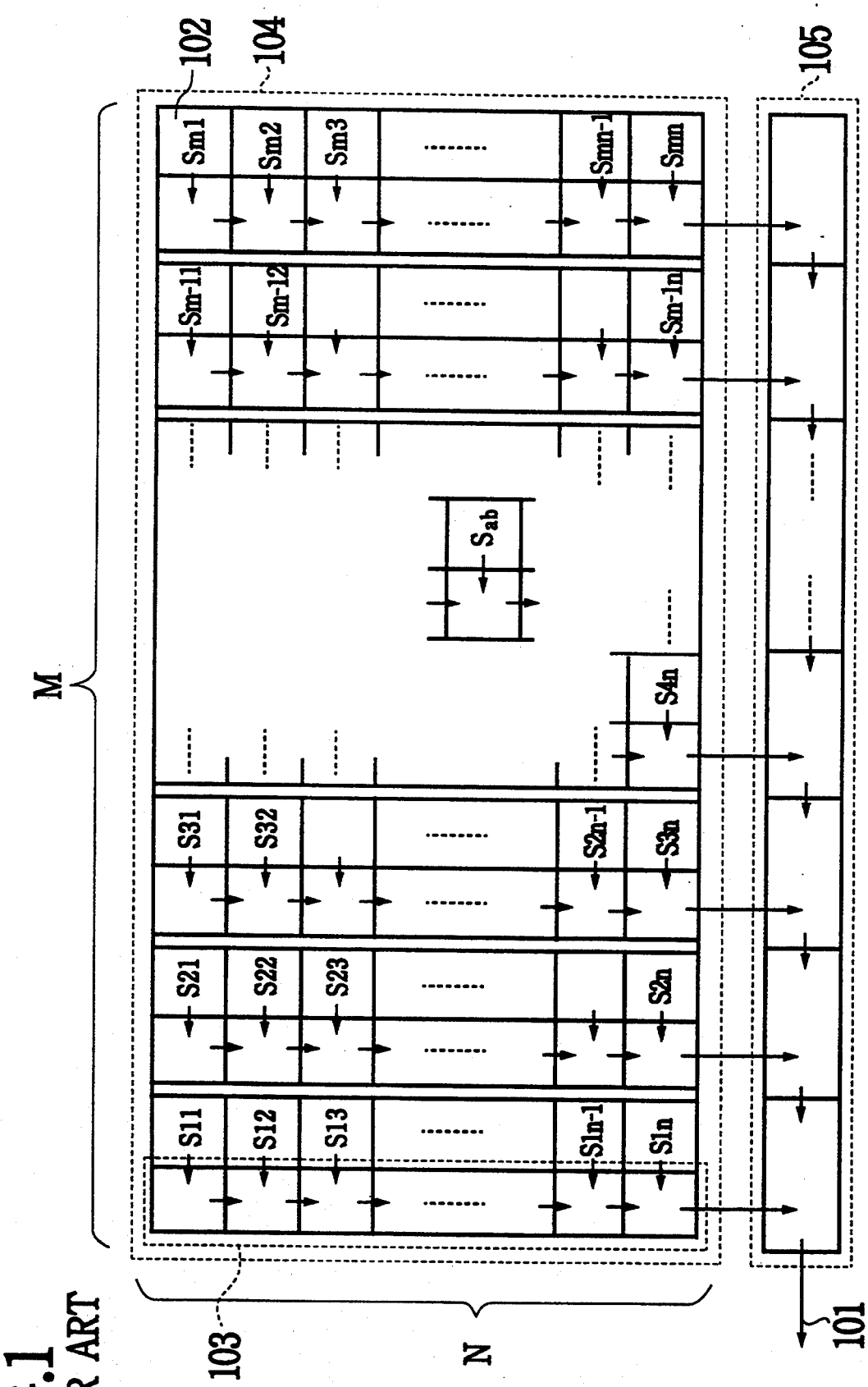
FIG. 1 is a schematic diagram of a configuration of a conventional CCD using a single read out line.
Figure 2:
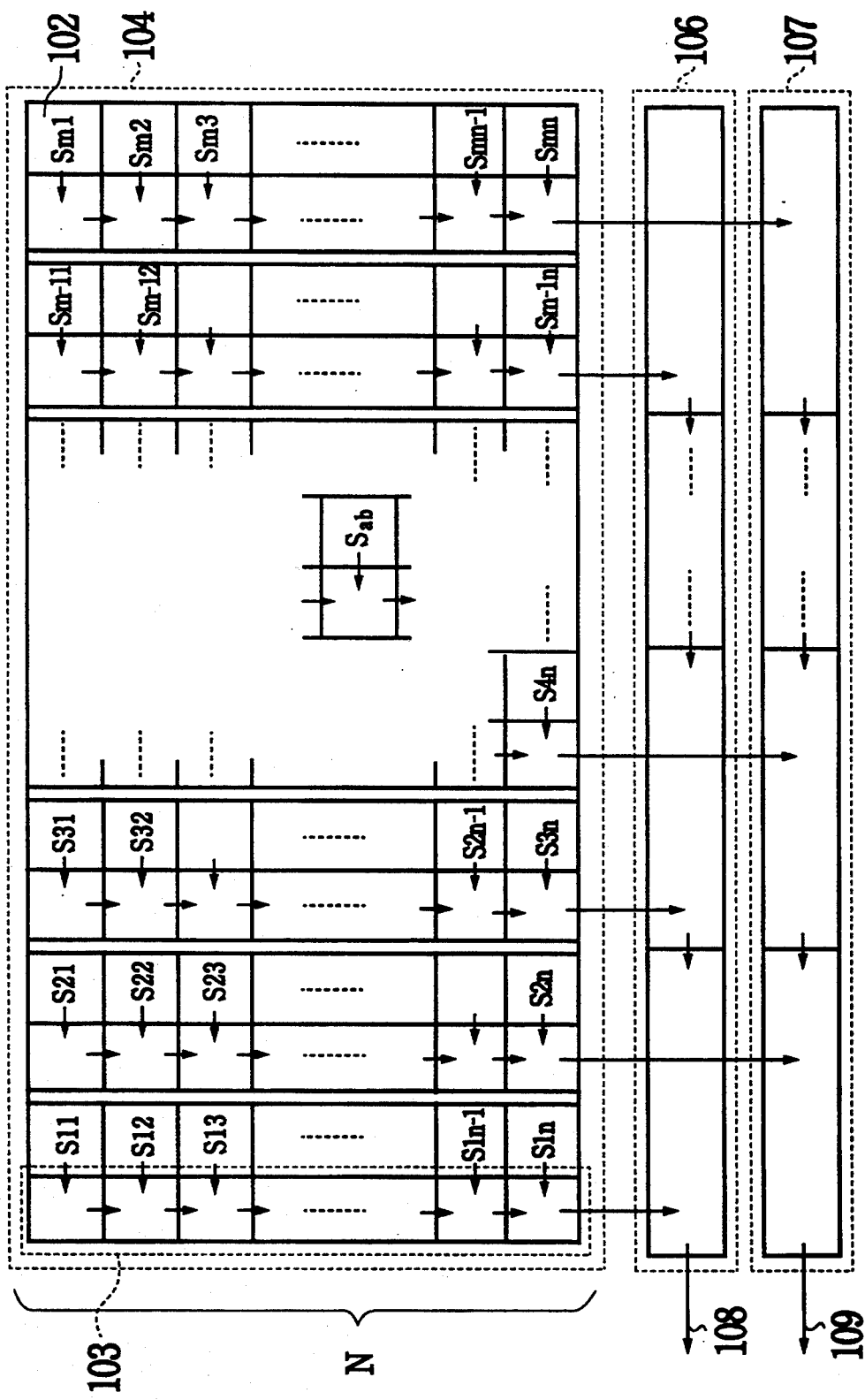
FIG. 2 is a schematic diagram of a configuration of a conventional CCD using double read out lines.
Figure 3:
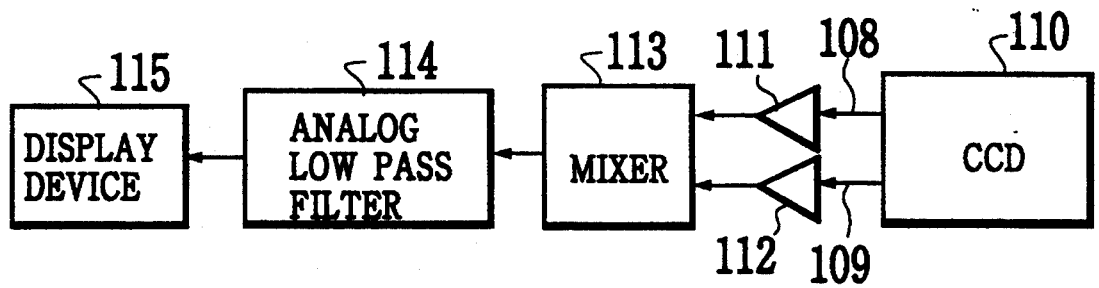
FIG. 3 is a block diagram of a conventional imaging apparatus incorporating the CCD using double read out lines of FIG. 2.
Figure 4A:
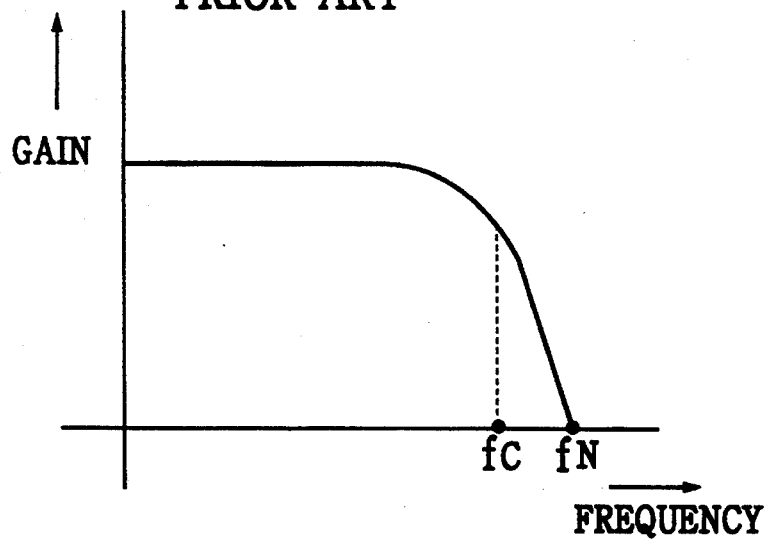
FIGS. 4A and 4B are graphs of gain versus frequency and group delay versus frequency, respectively, for an analog low pass filter used in the imaging apparatus of FIG. 3.
Figure 4B:
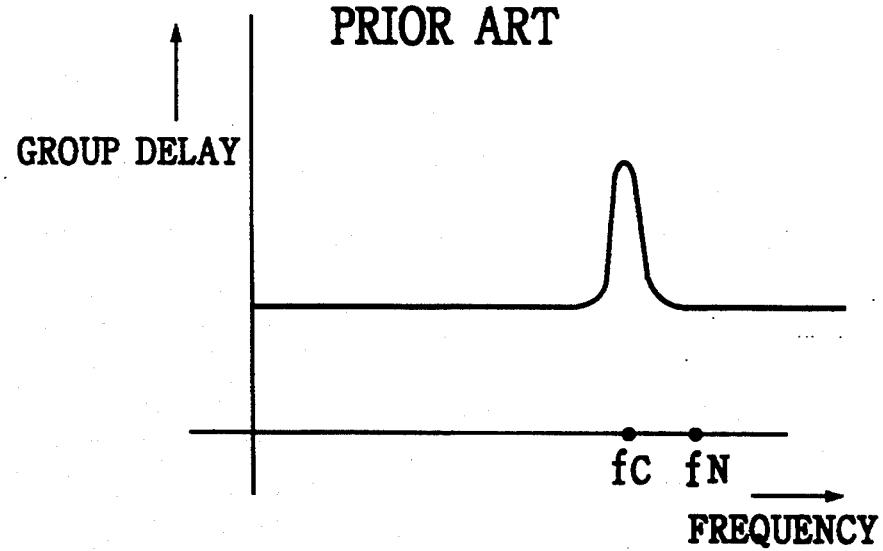

Referring now to FIG. 6, one embodiment of an X-ray diagnostic apparatus suitable for employing an imaging apparatus according to the present invention will be described in detail first.

In this embodiment, the X-ray diagnostic apparatus comprises: an X-ray tube 1 for irradiating X-rays onto a patient M; a bed 2 for supporting the patient M under the X-ray tube 1 in which a portion supporting the patient M is made of a material easily penetrable by the X-rays; an image intensifier (I.I) 3 placed below the bed 2 for receiving the X-rays penetrated through the patient M and converting the received X-rays into optical image data; a lens mechanism 5 attached below the image intensifier 3 for focusing the optical image data obtained by the image intensifier 3; a supporting mechanism for supporting the X-ray tube 1 and the lens mechanism 5 in appropriate positions above and below the bed 2, respectively; a CCD 6 for receiving the optical image data focused by the lens mechanism 5 and converting the received optical image data into electric signals through double read out lines 7 and 8; an image processing device 9 for processing the image data represented by the electric signals transmitted through the read out lines 7 and 8 to obtain appropriate display image data; and a display device 10 for displaying the display image data obtained by the image processing device 9, where the CCD 6, first and second read out lines 7 and 8, the image processing device 9, and the display device 10 constitutes the imaging apparatus according to the present invention various embodiments of which will be described in detail below.

Figure 7:
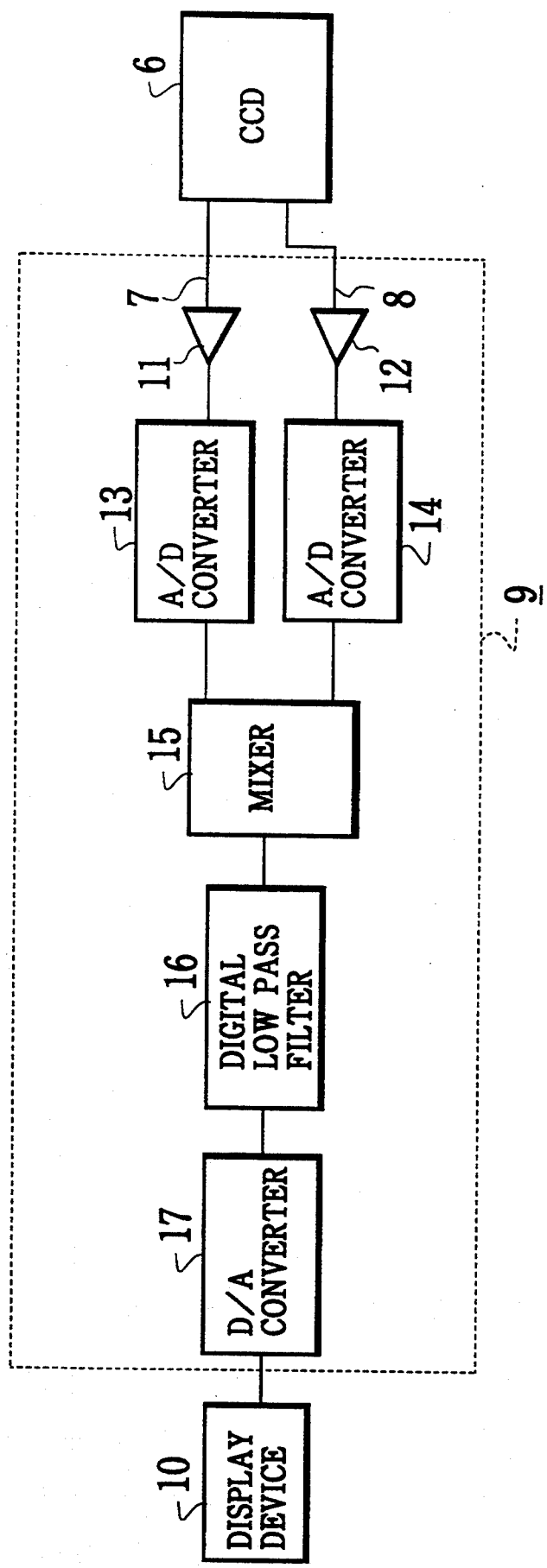
FIG. 7 is a block diagram of a first embodiment of an imaging apparatus according to the present invention.

Referring now to FIG. 7, a first embodiment of an imaging apparatus according to the present invention which is suitable for the X-ray diagnostic apparatus of FIG. 6 will be described in detail.

In this first embodiment of the imaging apparatus, the image processing device 9 comprises: a first amplifier 11 for amplifying the output of the first read out line 7; a second amplifier 12 for amplifying the output of the second read out line 8; a first A/D converter 13 for converting the amplified output of the first amplifier 11 into digital signals; a second A/D converter 14 for converting the amplified output of the second amplifier 12 into digital signals; a mixer 15 for mixing the digital signals obtained by the first and second A/D converters 13 and 14 to obtain the image data in an appropriately rearranged order; a digital low pass filter 16 for filtering the output of the mixer 15 to remove the Nyquist frequency component; and a D/A converter for converting the filtered output of the digital low pass filter 16 into analog signals representing the display image data to be supplied to the display device 10.

Figure 8A:
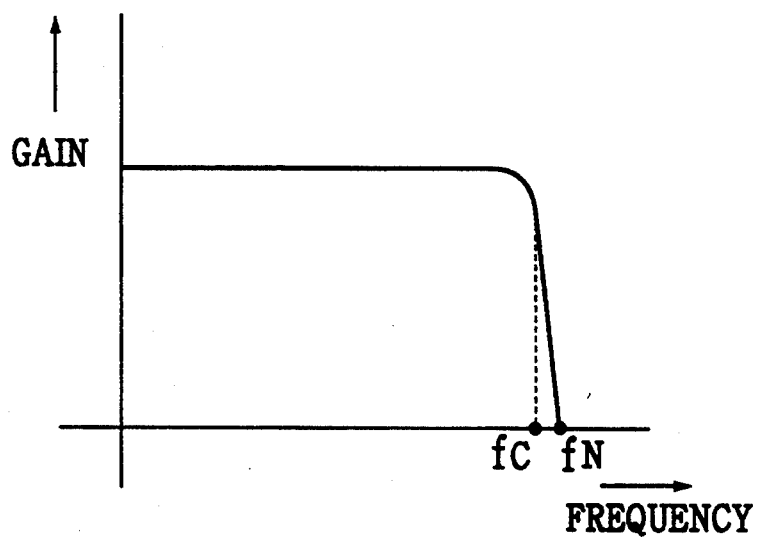
FIGS. 8A and 8B are graphs of gain versus frequency and group delay versus frequency, respectively, for a digital low pass filter used in the imaging apparatus of FIG. 7.

Here, the digital low pass filter 16 removes a component at a specific frequency called the Nyquist frequency which is the highest frequency in the image data obtained by the mixer 15, so as to prevent the appearance of the false image in a form of vertical stripes due to the discrepancy between the image data of the odd columns and the image data of the even columns. In this digital low pass filter 16, the cut-off frequency fC can be set closer to the Nyquist frequency fN easily, as shown in FIG. 8A, by increasing a number of taps used, so that it is possible for this digital low pass filter 15 to remove the Nyquist frequency component completely, while leaving the remaining components of the image data substantially unaffected, without causing the lowering of the resolution in the display image data.

Moreover, the operation characteristics of the digital low pass filter 16 can be set easily by adjusting its coefficient factors, so that a number of digital low pass filters can be provided without product variations.

Figure 8B:
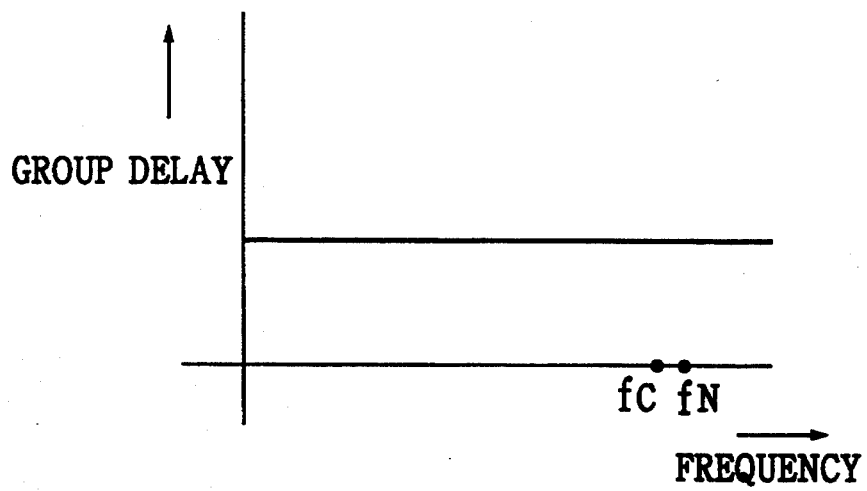

In particular, it is desirable to use the FIR (Finite Impulse Response) type digital low pass filter for this digital low pass filter 16, as the FIR type digital low pass filter can easily realize a smooth group delay characteristic as shown in FIG. 8B, so that the ringing artifact is not caused even when the cut-off frequency fC is brought closer to the Nyquist frequency fN.

Thus, according to this first embodiment, it is possible to provide an imaging apparatus using more than one image signal read out lines with an improved image quality, capable of preventing the lowering of the resolution and the appearance of the ringing artifact, as well as the appearance of the false image in a form of vertical stripes, so that it is particularly suitable for the application in the X-ray diagnostic apparatus as shown in FIG. 6.

Figure 8C:
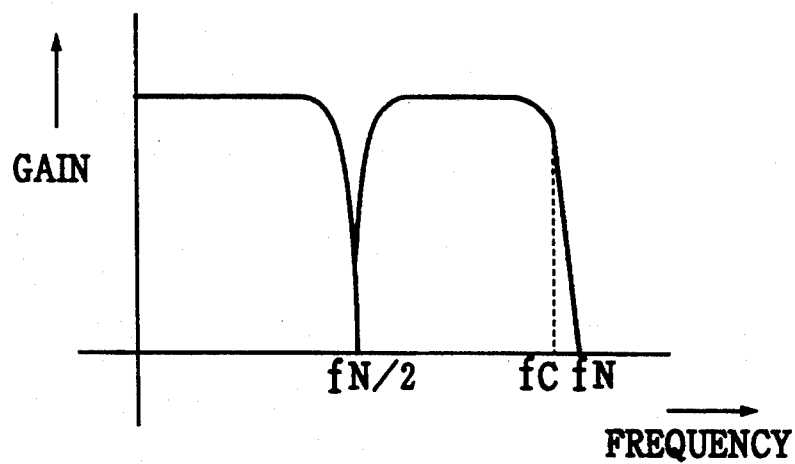
FIG. 8C is a graph of gain versus frequency for a digital low pass filter used in the first embodiment of an imaging apparatus according to the present invention in a case of using four read out lines.

It is to be noted here that, in the first embodiment described above, it is possible to increase a number of read out lines to be any desired number greater than two used in the above. In such a case of using multiple read out lines, it is necessary for the digital low pass filter 16 to remove not just the Nyquist frequency component but also the other specific frequency components in order to prevent the appearance of the false image in a form of vertical stripes due to the discrepancy between the image data of the odd columns and the image data of the even columns. For example, in a case of using four data read lines, the digital low pass filter 16 is required to remove the components at the Nyquist frequency fN as well as at a half of the Nyquist frequency fN/2, as indicated in FIG. 8C. Such a filtering characteristic can be realized by the digital low pass filter 16 easily by appropriately adjusting its coefficient factors.

Referring now to FIG. 9, a second embodiment of an imaging apparatus according to the present invention which is suitable for the X-ray diagnostic apparatus of FIG. 6 will be described in detail. Here, those elements which are substantially equivalent to the corresponding elements in the first embodiment of FIG. 7 described above will be given the same reference numerals in FIG. 9.

In this second embodiment of the imaging apparatus, the image processing device 9 of the first embodiment described above is replaced by an image processing device 20 which comprises: a first amplifier 11 for amplifying the output of the first read out line 7; a second amplifier 12 for amplifying the output of the second read out line 8; a mixer 18 for mixing the amplified outputs of the first and second amplifiers 11 and 12 to obtain the image data in an appropriately rearranged order; an A/D converter 19 for converting the appropriately rearranged image data obtained by the mixer 18 into digital signals; a digital low pass filter 16 for filtering the digital signals obtained by the A/D converter 19 to remove the Nyquist frequency component; and a D/A converter for converting the filtered output of the digital low pass filter 16 into analog signals representing the display image data to be supplied to the display device 10.

Thus, in this second embodiment, the image data are rearranged in an appropriate order in an analog state by the mixer 18, and then converted into the digital signal by the A/D converter 19, instead of mixing the A/D converted image data at the mixer 15 in the first embodiment described above.

It should be obvious that the same effects as described above for the first embodiment can also be achieved by this second embodiment.

It is to be noted here that, in this second embodiment, it is also possible to increase a number of read out lines to be any desired number greater than two, just as in the first embodiment described above, by appropriately setting the filtering characteristic of the digital low pass filter 16.

Figure 10:
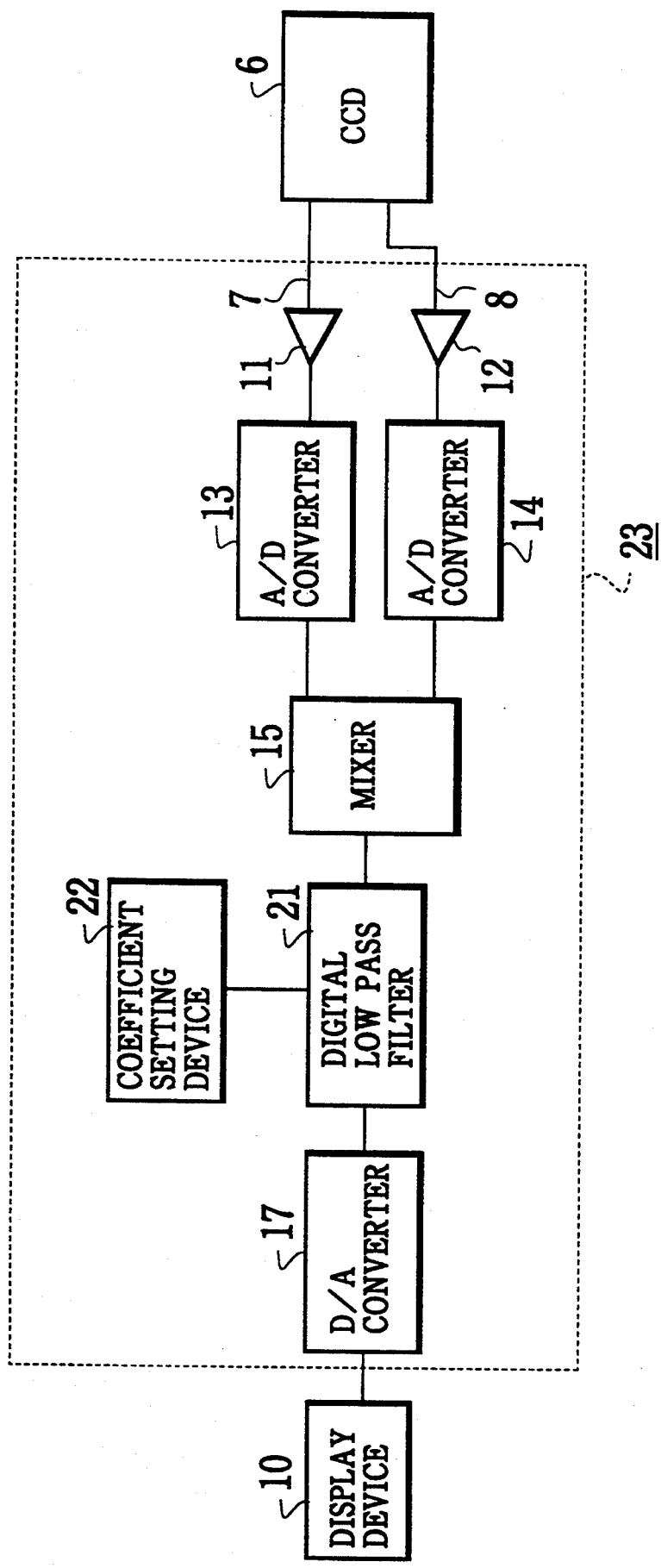
FIG. 10 is a block diagram of a third embodiment of an imaging apparatus according to the present invention.

Referring now to FIG. 10, a third embodiment of an imaging apparatus according to the present invention which is suitable for the X-ray diagnostic apparatus of FIG. 6 will be described in detail. Here, those elements which are substantially equivalent to the corresponding elements in the first embodiment of FIG. 7 described above will be given the same reference numerals in FIG. 9, and their detailed descriptions will be omitted.

In this third embodiment of the imaging apparatus, the image processing device 9 of the first embodiment described above is replaced by an image processing device 23 in which the digital low pass filter 16 of the first embodiment is replaced by a digital low pass filter 21 equipped with a coefficient setting device 22 for setting the coefficient factors of the digital low pass filter 21 to adjust its frequency characteristic. The rest of this image processing device 23 is equivalent to that of the image processing device 9 of the first embodiment.

Thus, in this third embodiment, by adjusting the coefficient factors of the digital low pass filter 21 from the coefficient setting device 22, it is possible to realize various frequency characteristics desirable in view of the image quality, in addition to realizing the required filtering characteristic for removing the Nyquist frequency component.

Figure 11A:
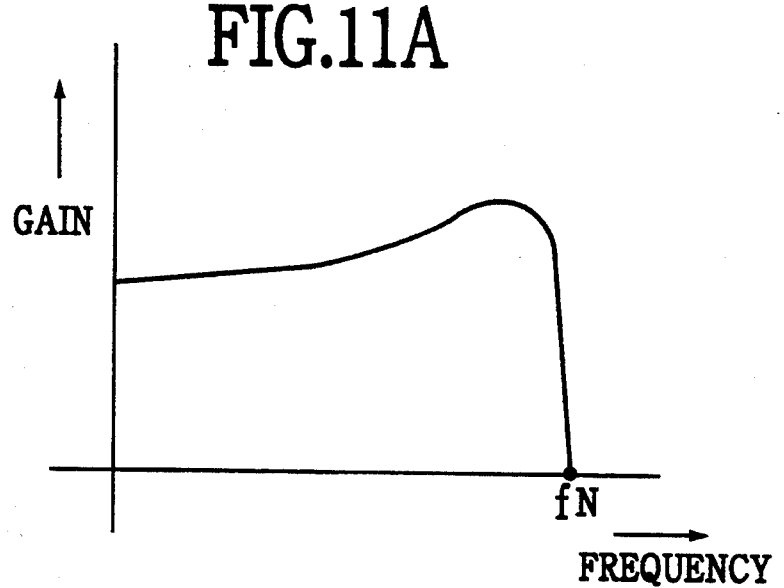
FIGS. 11A, 11B, and 11C are graphs of gain versus frequency for various gain characteristics realizable by a digital low pass filter used in the imaging apparatus of FIG. 10.
Figure 11B:
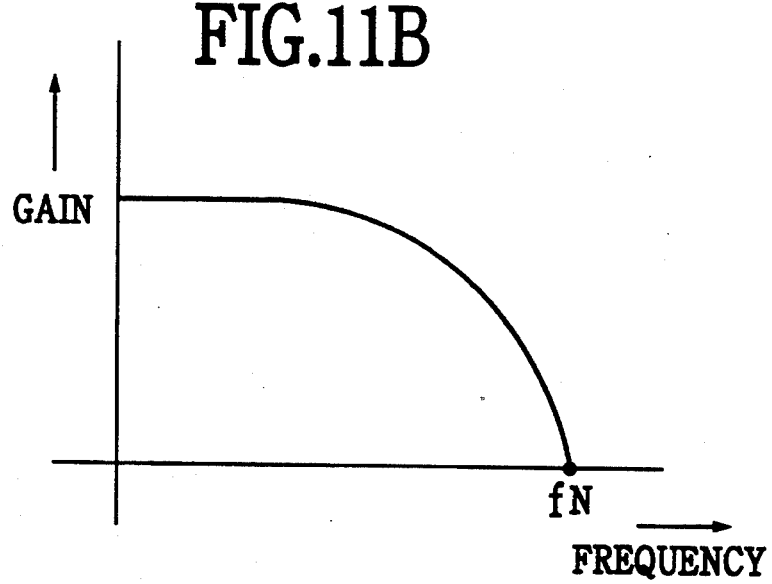
Figure 11C:
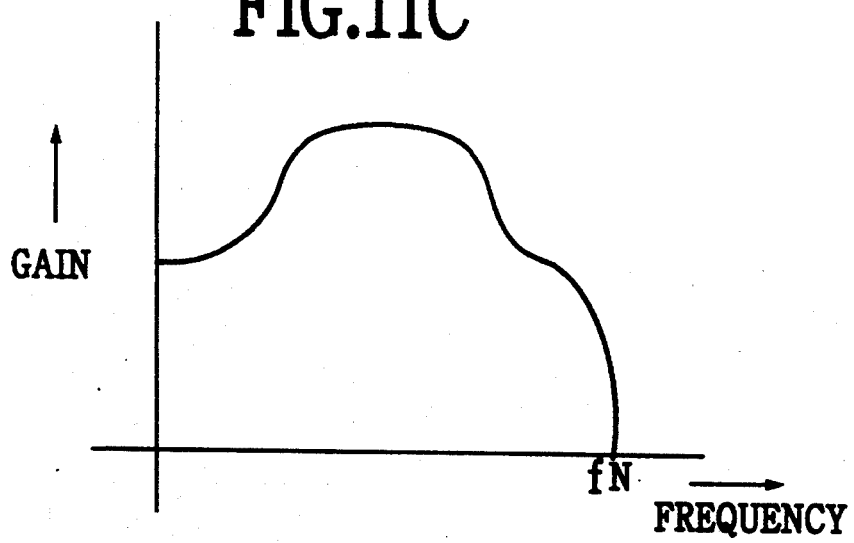

For example, the frequency characteristic of the digital low pass filter 21 can be set in a form shown in FIG. 11A in which the higher frequency components are emphasized, or in a form shown in FIG. 11B in which the lower frequency components are emphasized, or in a form shown in FIG. 11C corresponding to the edge emphasizing.

It is to be noted that, although this third embodiment has been described above as a modification of the first embodiment of FIG. 7, the similar modification can also be made in the second embodiment of FIG. 9 by replacing the digital low pass filter 16 in FIG. 9 by the digital low pass filter 21 equipped with the coefficient setting device 22 as described above.

Now, when the imaging apparatus according to the present invention as illustrated by the various embodiments described above is employed in the X-ray diagnostic apparatus of FIG. 6 which requires a relatively large number of picture elements compared with the other medical equipments using CCD, the displayed images of a high image quality can be provided for the purpose of making the diagnosis of small tumors within fine blood vessels or internal organs, as the lowering of the resolution, the appearance of the ringing artifact, and the appearance of the false image in a form of vertical stripes are all prevented completely in the displayed images by means of the imaging apparatus according to the present invention as described above.

In addition, in the diagnosis of small tumors using such an X-ray diagnostic apparatus, it is often easier to make the accurate diagnosis by appropriately adjusting image quality of the displayed images by changing the frequency characteristic of the displayed image data depending on the imaged portion of the patient, and such an adjustment of the image quality can be made easily in the imaging apparatus of the present invention as described above, so that the diagnostic performance can be improved considerably by using the X-ray diagnostic apparatus incorporating the imaging apparatus of the present invention.

It is to be noted here that, the CCD 6 used in various embodiments of the imaging apparatus according to the present invention described above may be replaced by any other known imaging element using multiple read out lines, if desired.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An imaging apparatus comprising:
    imaging element means for receiving optical image data of an imaging target and converting the received optical image data into electric signals and having a plurality of read out lines for outputting the obtained electric signals;

mixing means for mixing the electric signals transmitted through the read out lines to obtain image data in an appropriately rearranged order and digital form;

digital low pass filter means, having a cut-off frequency set in a vicinity of a Nyquist frequency for the image data, for digitally removing at least one specific frequency component from the image data obtained by the mixing means to obtain display image data; and display means for displaying the display image data obtained by the digital low pass filter means.

2. The apparatus of claim 1, wherein the digital low pass filter is of a finite impulse response type.

3. The apparatus of claim 1, wherein the imaging element means has two read out lines, and the digital low pass filter means removes the specific frequency component at a Nyquist frequency of the image data.

4. The apparatus of claim 1, further comprising coefficient setting means for adjustably setting coefficient factors of the digital low pass filter means to determine a frequency characteristic of the digital low pass filter means.

5. The apparatus of claim 1, wherein the imaging element means comprises a CCD (charge coupled device).

6. An X-ray diagnostic apparatus comprising:

X-ray source means for irradiating X-rays onto an imaging target;

image intensifier means for receiving the X-rays irradiated onto the imaging target and penetrated through the imaging target, and converting the received X-rays into optical image data;

imaging element means for receiving the optical image data obtained by the image intensifier means and converting the received optical image data into electric signals and having a plurality of read out lines for outputting the obtained electric signals;

mixing means for mixing the electric signals transmitted through the read out lines to obtain image data in an appropriately rearranged order and digital form;

digital low pass filter means, having a cut-off frequency set in a vicinity of a Nyquist frequency for the image data, for digitally removing at least one specific frequency component from the image data obtained by the mixing means to obtain display image data; and displaying means for displaying the display image data obtained by the digital low pass filter means.

7. The apparatus of claim 6, wherein the digital low pass filter is of a finite impulse response type.

8. The apparatus of claim 6, wherein the imaging element means has two read out lines, and the digital low pass filter means removes the specific frequency component at a Nyquist frequency of the image data.

9. The apparatus of claim 6, further comprising coefficient setting means for adjustably setting coefficient factors of the digital low pass filter means to determine a frequency characteristic of the digital low pass filter means.

10. The apparatus of claim 6, wherein the imaging element means comprises a CCD (charge coupled device).

* * * * *